United States Patent [19]

Gemeinhardt

[11] Patent Number: 4,932,470
[45] Date of Patent: Jun. 12, 1990

[54] APPARATUS FOR TRANSFERRING MASS AND/OR HEAT

[75] Inventor: Hermann Gemeinhardt, Obernburg, Fed. Rep. of Germany

[73] Assignee: Akzo N.V., Arnhem, Netherlands

[21] Appl. No.: 325,980

[22] Filed: Mar. 20, 1989

[30] Foreign Application Priority Data

Mar. 22, 1988 [DE] Fed. Rep. of Germany ....... 3809557

[51] Int. Cl.$^5$ .............................................. F28F 9/04
[52] U.S. Cl. .................................. 165/158; 210/321.8; 210/321.89
[58] Field of Search ................ 165/158; 285/231, 374, 285/364; 210/321.8, 321.89

[56] References Cited

U.S. PATENT DOCUMENTS 2,170,181  8/1939  Allen et al. ........................ 285/231
3,945,431  3/1976  Straub ................................... 165/11
4,708,796  11/1987  Yoshimoto et al. ............. 210/321.8

FOREIGN PATENT DOCUMENTS 0168558  1/1986  European Pat. Off. .
0181470  5/1986  European Pat. Off. .
2554062  6/1976  Fed. Rep. of Germany .
2632044  3/1977  Fed. Rep. of Germany .

Primary Examiner—Martin P. Schwadron
Assistant Examiner—Allen J. Flanigan
Attorney, Agent, or Firm—Oliff & Berridge

[57] ABSTRACT

An apparatus for transferring mass and/or heat comprising a casing, at least two tube sheets and a plurality of tubes. The tubes are connected with the tube sheets and the tube sheets are formed such that they are arranged partly in openings provided in the casing and partly outside the casing, overlapping the casing openings. A seal is disposed between sheets and casing inside and outside the casing openings and the tube sheet has been fabricated by casting onto the casing.

2 Claims, 1 Drawing Sheet

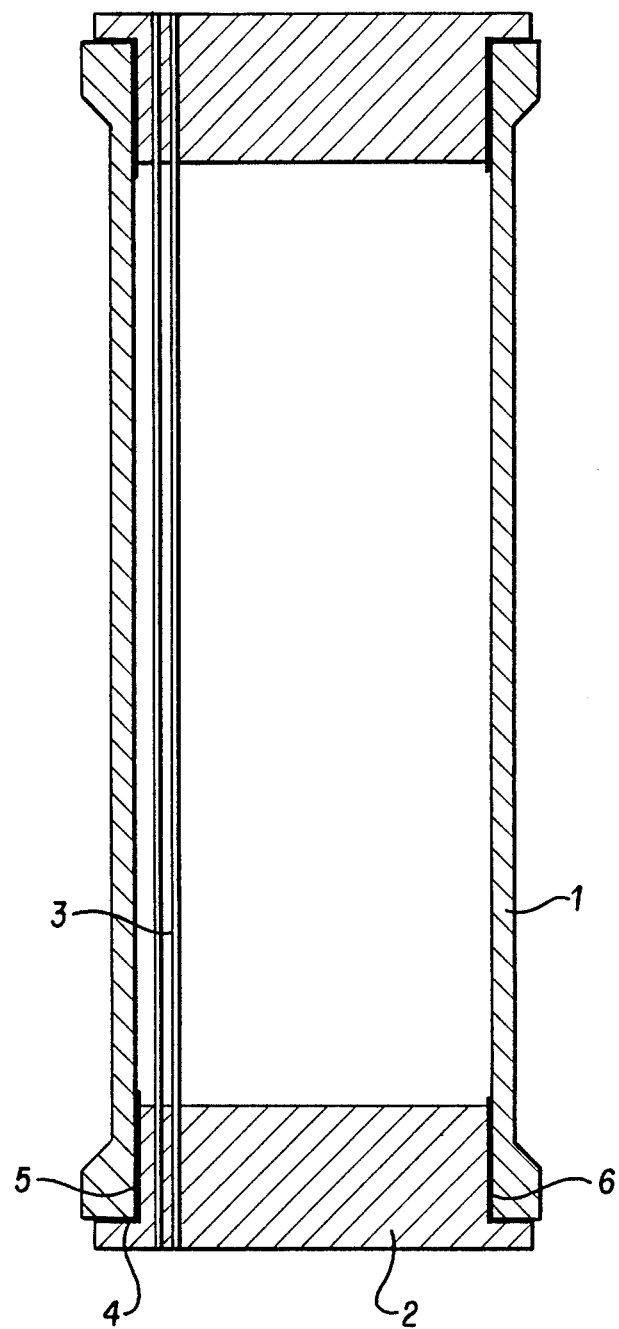

APPARATUS FOR TRANSFERRING MASS AND/OR HEAT

TECHNICAL FIELD

The invention relates to an apparatus for transferring mass and/or heat, comprising a casing, at least two tube sheets and a plurality of tubes. The tube ends are connected with the tube sheets and the tube sheets are so formed that they are disposed partly in openings provided in the casing and partly outside the casing, overlapping the casing openings.

BACKGROUND

Apparatus of this type for transferring mass are known from West German Accepted Application (DE-AS) 2,554,062. Therein, the tube sheets, because of the overlapping of the casing openings, have the advantage that sealing surfaces are present between the overlap and the casing opening, which surfaces permit good sealing by bracing the tube sheets against the casing—if necessary by interposing sealing rings. Such a configuration is only possible, however, if the tube sheets are fabricated separately. For installation in the casing, the tubes must be threaded into holes provided in the tube sheet and must be connected to the tube sheet. Thus the fabrication of such apparatus for transferring mass is very expensive.

Apparatus for transferring mass and/or heat are also known in which the tube sheets are fabricated by assembly, a sealing compound in which the tube ends are embedded and which subsequently hardens being cast in the casing openings. Self-curing casting compounds or thermoplastic melts (European Patent A 168,558) are used for this purpose. In this type of fabrication, which is less expensive, tube sheets that overlap the casing openings can indeed also be fabricated, but it has been found that detachment of the casting compound from the casing occurs because of the unavoidable volume decrease of the casting compound during hardening. Sealing by bracing is no longer guaranteed in this type of fabrication, because an uneven tube sheet surface is produced due to the detachment of the tube sheet from the casing. Apparatus for transferring mass and/or heat of the initially mentioned type with a large number of tubes have therefore been regarded as unmakeable in this way.

SUMMARY OF THE INVENTION

It is an object of the present invention to provide an apparatus for transferring mass and/or heat of the initially mentioned type that can be fabricated with small expense and at the same time has a leaktightness between tube sheet and casing that heretofore could be guaranteed only by very expensive fabrication processes.

This and other objects are achieved by an apparatus for transferring mass and/or heat of the initially mentioned type wherein a seal is disposed between the tube sheet and the casing, inside and outside the casing opening, and wherein the tube sheet has been fabricated by casting onto the casing.

BRIEF DESCRIPTION OF THE DRAWING

The invention will be explained in more detail by reference to the accompanying FIG. 1, which shows a segment of an apparatus for transferring mass and/or heat according to the invention.

DETAILED DESCRIPTION OF PREFERRED EMBODIMENTS

By the arrangement of the seal inside and outside the casing opening, the ability of the sealing compound to penetrate between the seal and the casing during fabrication is reliably prevented. The volume decrease during hardening no longer has an influence, since unexpectedly the tube sheet unevennesses caused by shrinkage can be compensated for by the seal. Good sealing in the overlap area can be achieved by bracing the tube sheet against the casing.

In molding processes that are carried out under pressure, such as, for example, centrifugal molding or centrifugal casting processes or injection molding, it is recommended that the seal consist of an elastic material. In this case the seal is compressed during casting and expands again during hardening of the sealing compound, so that the space between casing and the hardened tube sheet is filled with the seal.

It is obvious when the tube sheet has been fabricated by molding onto the casing, because in this fabrication process the tubes are not disposed completely uniformly and because fabrication beforehand is ruled out due to the overlapping of the casing opening from the outside by the tube sheet.

Within the framework of the present invention, tubes also refer to hollow filaments and tubes with a plurality of through-going lumens.

In the FIG. 1, the casing is denoted by 1, the tube sheet by 2 and the tubes by 3. For clarity, only one casing opening with one tube sheet 2 and one segment of the casing 1 as well as only two tubes 3 is shown in the FIGURE. The tubes 3 are embedded in the sealing compound, which is disposed partly inside the casing opening (in zone 5) and partly outside the casing opening, overlapping the casing opening (zone 4), and which forms the tube sheet. The seal 6 is disposed between tube sheet and casing, inside (zone ) and outside (zone 4) the casing opening.

I claim:

1. An appartus for transferring mass and/or heat comprising:
    a casing having two openings;
    at least two tube sheets, each tube sheet being molded in one of the two openings in the casing, each tube sheet including a portion extending into the associated opening in the casing and a portion extending outside and in overlapping relationship with the opening;
    a plurality of tubes extending from one tube sheet to the other tube sheet, the respective ends of the tubes being in sealed relationship with the tube sheets; and
    seal members disposed in sealing relationship between each tube sheet and the casing, each seal member having a portion thereof disposed between the opening in the casing and the tube sheet and a portion thereof disposed between the portion of the tube sheet which overlaps the opening in the casing and the portion of the casing overlapped by the tube sheet.

2. An apparatus according to claim 1, wherein the seal is made of an elastic material.

* * * * *